United States Patent
Hill

(10) Patent No.: US 9,716,909 B2
(45) Date of Patent: Jul. 25, 2017

(54) MOBILE VIDEO EDITING AND SHARING FOR SOCIAL MEDIA

(71) Applicant: SketchPost, LLC, New London, CT (US)

(72) Inventor: Josh Hill, Baltic, CT (US)

(73) Assignee: Sketchpost, LLC, New London, CT (US)

( * ) Notice: Subject to any disclaimer, the term of this patent is extended or adjusted under 35 U.S.C. 154(b) by 49 days.

(21) Appl. No.: 14/547,270

(22) Filed: Nov. 19, 2014

(65) Prior Publication Data

US 2015/0139615 A1 May 21, 2015

Related U.S. Application Data

(60) Provisional application No. 61/906,120, filed on Nov. 19, 2013.

(51) Int. Cl.
*H04N 5/93* (2006.01)
*H04N 21/2743* (2011.01)
*G11B 27/031* (2006.01)
*G11B 27/34* (2006.01)

(52) U.S. Cl.
CPC ....... *H04N 21/2743* (2013.01); *G11B 27/031* (2013.01); *G11B 27/34* (2013.01)

(58) Field of Classification Search
CPC ............ G11B 27/036; G11B 20/10527; G11B 2020/10574; G11B 27/031; G11B 27/34; H04N 21/2743
See application file for complete search history.

(56) References Cited

U.S. PATENT DOCUMENTS

| | | | | |
|---|---|---|---|---|
| 5,119,474 A | * | 6/1992 | Beitel | G06F 17/30017 707/E17.009 |
| 5,151,998 A | * | 9/1992 | Capps | G11B 27/031 345/440 |
| 6,067,126 A | * | 5/2000 | Alexander | G11B 27/034 348/722 |
| 6,430,355 B1 | * | 8/2002 | Nagasawa | G11B 27/034 360/13 |
| 6,877,134 B1 | * | 4/2005 | Fuller | G06F 17/30265 707/999.104 |
| 6,956,964 B2 | * | 10/2005 | Lee | G09G 3/003 345/419 |

(Continued)

*Primary Examiner* — David Harvey
(74) *Attorney, Agent, or Firm* — Michael J. Mehrman; Mehrman Law Office PC

(57) ABSTRACT

A mobile video editing and sharing systems for social media referred to as the CAPTURE system, which improves over prior video editing systems for smartphones through a more extensive editing suite including functionality for adding and altering music to video files. The video editing portion of the system allows for further creative freedom and expansion than what is already offered. Firstly, current limitation on video are length are far too short; the system allows users to record up to one full minute of video, as well the ability to choose previously recorded video footage from the user's "Camera Roll" within the iOS software. Following this, the CAPTURE system offers a variety of specialty filters in addition to the color alteration filters typically provided in prior systems. The filters include reverse, speed and 3D effect, which adjust the visual content of the video without altering the music track.

30 Claims, 24 Drawing Sheets

(56) References Cited

U.S. PATENT DOCUMENTS

| | | | | |
|---|---|---|---|---|
| 7,302,158 B1* | 11/2007 | Asato | | G11B 27/036 |
| | | | | 386/230 |
| 7,319,764 B1* | 1/2008 | Reid | | G06F 3/04847 |
| | | | | 345/440 |
| 8,745,500 B1* | 6/2014 | Kostello | | G11B 27/031 |
| | | | | 386/282 |
| 2004/0263914 A1* | 12/2004 | Yule | | H04L 12/58 |
| | | | | 358/402 |
| 2006/0078287 A1* | 4/2006 | Cheng | | G11B 27/034 |
| | | | | 386/271 |
| 2007/0260968 A1* | 11/2007 | Howard | | G11B 27/034 |
| 2008/0046936 A1* | 2/2008 | Dam | | H04N 21/4325 |
| | | | | 725/88 |
| 2008/0115063 A1* | 5/2008 | Glenn | | G11B 27/036 |
| | | | | 715/728 |
| 2009/0018898 A1* | 1/2009 | Genen | | G06Q 30/0601 |
| | | | | 705/26.7 |
| 2010/0257994 A1* | 10/2010 | Hufford | | G10H 1/0025 |
| | | | | 84/609 |
| 2011/0142420 A1* | 6/2011 | Singer | | G06F 17/30017 |
| | | | | 386/280 |
| 2011/0320560 A1* | 12/2011 | Bennett | | G06Q 50/01 |
| | | | | 709/217 |
| 2012/0236201 A1* | 9/2012 | Larsen | | H04N 21/235 |
| | | | | 348/468 |
| 2012/0308209 A1* | 12/2012 | Zaletel | | G11B 27/034 |
| | | | | 386/278 |
| 2013/0073960 A1* | 3/2013 | Eppolito | | G11B 27/034 |
| | | | | 715/716 |
| 2014/0123041 A1* | 5/2014 | Morse | | G11B 27/031 |
| | | | | 715/765 |
| 2014/0278969 A1* | 9/2014 | Newell | | G06Q 30/0276 |
| | | | | 705/14.53 |
| 2014/0281984 A1* | 9/2014 | Milne | | G06F 17/30778 |
| | | | | 715/716 |
| 2015/0058733 A1* | 2/2015 | Novikoff | | G11B 27/031 |
| | | | | 715/723 |
| 2015/0380053 A1* | 12/2015 | Gordon | | G11B 27/034 |
| | | | | 386/282 |
| 2016/0253715 A1* | 9/2016 | Xie | | G06Q 30/0251 |
| | | | | 705/14.72 |

* cited by examiner

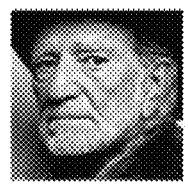 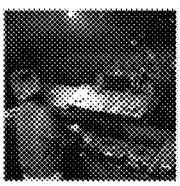   
Country    Electronic    Hip Hop    Reggae    Clas
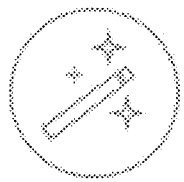 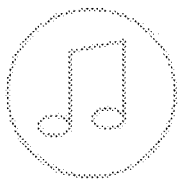 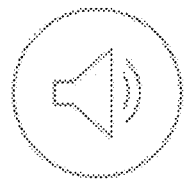
Effects    Music    Volume
FIG. 5

●●●○○ JellyJar     10:22 AM 

< Home     Comments

 Anthony Lagoon    3d
Super awesome video! What filter and soundtrack did you use?

 Mary Jones    12h
This is a longer comment that will wrap all the way to to four lines. Users should not have a limit as to how long comments are.

 Seth Anderson    3h
Very cool! Good choice on the soundtrack!

 Amanda Smith    2h
Nice work! Where in the park was this?

 Jennifer Jones    8h
@Nicole this is what a mention looks like.

Add a comment... 

MOBILE VIDEO EDITING AND SHARING FOR SOCIAL MEDIA

TECHNICAL FIELD

The present invention relates to social media content and, more particularly, to a mobile video editing and sharing system suitable for using mobile computing devices, such as smartphones, to create, edit and post video files to social media networks.

BACKGROUND

Previous social media video sharing technologies allow a user to record a video, apply a filter for color alteration, and output video files to various social media networks. These technologies are typically limited to a maximum video recording time of 15 seconds with editing limited to color alteration. There are presently no social media video editing and sharing systems that support greater recording and editing functionality, such as adding music to video files. There is, therefore, a continuing need for improved mobile video editing and sharing systems for social media.

SUMMARY

The present invention may be embodied in a mobile video editing and sharing systems for social media referred to as the CAPTURE system. While current market applications (such as Vine, Instagram, etc.) provide social sharing software, they have very limited recording time and editing capabilities. The CAPTURE system improves over prior video editing systems for smartphones through a more extensive editing suite including, among other features, functionality for adding and altering music to video files.

In an illustrative embodiment, a method for editing a video file on a portable computing device includes receiving a video file containing visual content and a native audio track recorded during creation of the visual content. A selection of a stored digital music track includes a start indicator for syncing a selected portion of the stored digital music track to play in association with playing of the video. A first volume control profile controls the native audio track in association with playing of the video. A second volume control profile, independent of the first volume control profile, controls the selected portion of the stored digital music track in association with playing of the video. An edited video file simultaneously plays the visual content, the native audio track adjusted by the first volume control profile, and the music track adjusted by the second volume control profile. A selection of a stored publication list includes one or more digital publication targets, and the edited video file is published to the publication list.

An option includes a voice-over track adjusted by a third volume control profile, which is independent of the first and second volume control profiles. A second edited video file simultaneously plays the visual content, the native audio track adjusted by the first volume control profile, the music track adjusted by the second volume control profile, and the voice-over track adjusted by the third volume control profile. A textual description of the content of the edited video file may be stored in association with the edited video file. One or more metadata tags may be stored in association with the edited video file, such as metadata tags identifying a person appearing in the visual content, a source of the music track, and a source of the voice-over track associated with the edited video file. A hashtag indicating social media trending information may be stored in association with the edited video file. A geolocation tag indicating geographic location associated with the edited video file may also be stored in association with the edited video file.

According to an aspect of an embodiment, a reverse filter command causes a portion of the visual content to play in reverse while continuing to playing the music track in forward. A speed filter command causes a portion of the visual content to play at a different speed while continuing to play the music track at normal speed. A 3D filter command causes a 3D effect configured to function with red/blue 3D glasses to be overlayed on the visual content.

According to another aspect of an embodiment, the edited video may be automatically stored to a network or cloud storage location in association with publication of the edited video file. If desired, the edited video may be automatically stored to a second network or cloud storage location in association with publication of the edited video file.

Additional features and advantages may be realized through the techniques of the present invention. Other embodiments and aspects of the invention are described below and considered a part of the claimed invention. For a better understanding of the invention with the advantages and the features, refer to the description and to the drawings.

BRIEF DESCRIPTION OF THE FIGURES

FIG. 5 is another example graphic user interface screen for an illustrative the mobile video editing and sharing system.

FIG. 16 is another example graphic user interface screen for an illustrative the mobile video editing and sharing system.

FIG. 17 is another example graphic user interface screen for an illustrative the mobile video editing and sharing system.

DETAILED DESCRIPTION

Figure 1:
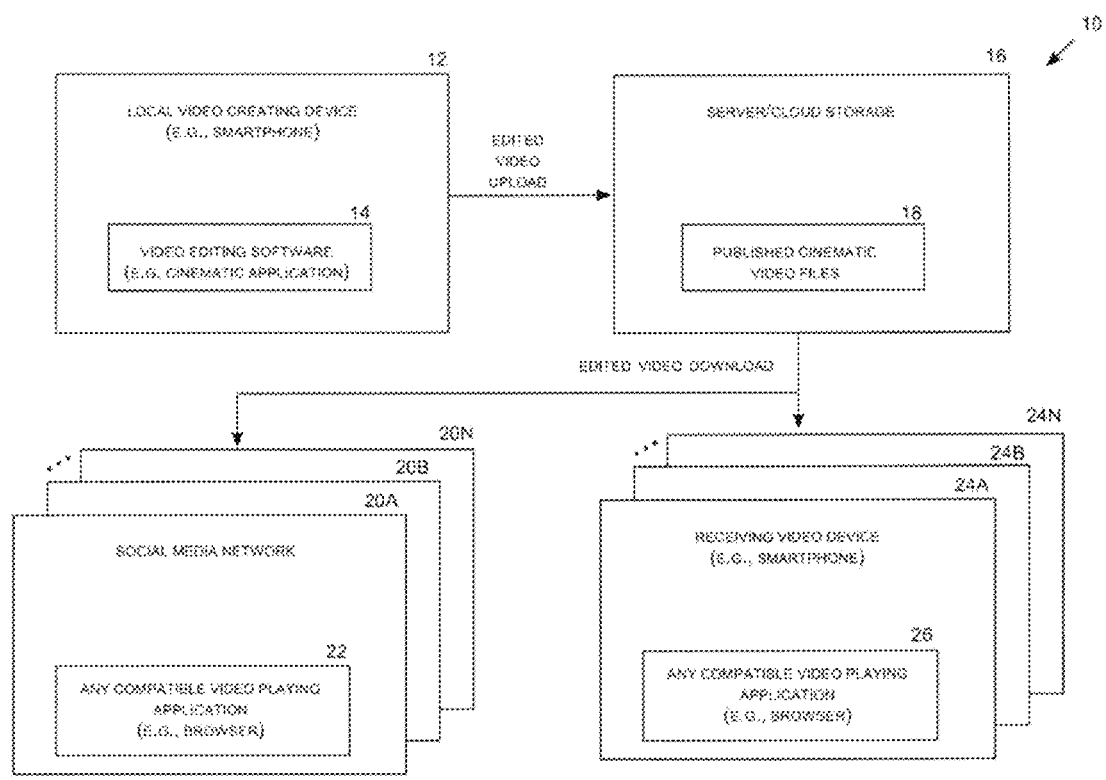
FIG. 1 is a functional block diagram of a distributed computer system implementing a mobile video editing and sharing system.

The present invention may be embodied in a mobile video editing and sharing systems for social media referred to as the CAPTURE system. While current market applications (such as Vine, Instagram, etc.) provide social sharing software, they have very limited recording time and editing capabilities. The CAPTURE system improves over prior video editing systems for smartphones through a more extensive editing suite including functionality for adding and altering music to video files. The video editing portion of the CAPTURE system allows for further creative freedom and expansion than what is conventionally offered. Firstly, the current limitations on video length are far too short; the CAPTURE system allows users to record up to one full minute of video, as well the ability to choose previously recorded video footage from the user's "Camera Roll" within the iOS software. Following this, the CAPTURE system offers a variety of specialty filters in addition to the color alteration filters typically provided in prior systems. These specialty filters include:

Reverse: The reverse filter plays every frame in the video in reverse order. Essentially, this plays the created video backwards. The Reverse filter does not affect audio or music tracks.

Speed: The speed filter plays every frame in the created video at a higher rate (i.e. making the video play faster). The speed filter shortens the video time; however, it does not affect the music track attached to the video.

Slow: The slow filter plays every frame in the created video at a slower rate (i.e. making the video play slower). The slow filter lengthens the video time; however, it does not affect the music track attached to the video.

3D: The 3D filter creates a faux 3D effect on the created video that functions with traditional red/blue 3D glasses. The filter first tints the video red, then creates an identical copy of the original video, overlaying it on the red copy using a blue tint, x-axis variation, and a mid-level of opacity.

On top of the extensive customization provided with these filters, the CAPTURE system also offers users the ability to add a music track, such as a music track selected from their personal iTunes Library or other digital music library, to any video. Instead of limiting the selection to predefined music tracks, the CAPTURE system caters to every user by providing access to the iTunes and other music libraries. Since a predefined set of tracks may not be sufficient for every person using the system, the CAPTURE system provides access to personal music libraries, which allows the music selection process to be unique for each person using the CAPTURE system. The CAPTURE system supports further music customization through a universal volume editor. After selecting the music track, the user is given the ability to create independent volume profiles for both the music track, and the native audio track within the video footage itself. This allows for a professional feel and an improved level of clarity to every video created.

The user is also able to share the edited video files to a variety of social networks including a combination of personal and video social networks, which is unique to the CAPTURE system. These social media networks include the CAPTURE network (all videos created are shared to this by default), Facebook, Twitter, YouTube, Vimeo, Tumblr, MySpace, and may be augmented to accommodate newly defined personal, small group (e.g., intranet), and wide area (e.g. Internet) social media networks.

Previous video sharing applications for social media offer a low level of creative customization and limit the user in sharing videos, for example through limited video length, limited editing capability, and limited access to social media networks. The CAPTURE system improves over these technologies through increased video recording time, improved video editing including the ability to add music to videos, and improved access to social media networks.

A particular embodiment of the CAPTURE system may be a video sharing application built for iOS on the Apple iPhone, which may be conveniently adapted to other smartphones and mobile computing devices, such as tablets, laptop computers, and the like. An illustrative version of the CAPTURE software application is compatible with all versions of the iPhone, as well as iPad devices that support iPhone software. On broad scale, the software allows users to record videos, stylize them through filters (i.e. color variations) and music, and share to the CAPTURE social network as well as Facebook, Twitter, YouTube, Vimeo, Tumblr and MySpace.

The CAPTURE application may be broken down into two main components: the social network, and the video editor. The CAPTURE network (i.e. social network) is the structure in which the system allows users to communicate and share with each other. Any video that a CAPTURE user creates can be posted to their "timeline" on this network. The timeline is a chronological display of the user's posted videos, as well as any video posted by user's that are being followed by the current user (as well allow users on the network to follow each other). As a note, user accounts are able to be made private. In this case, in order to follow a "private" user, they must approve a follow request from you before the follow will take effect.

Further social networking components allow users to "like" and "comment" on other's videos. "Liking" a video is an action that publicly displays your affinity for any given video. Each video displays the number of "likes" it has accumulated. Thus, the more "likes" a video has, the more popular it is on the CAPTURE network. Likewise, "commenting" on a video simply posts a message (from you) to a message thread (created by all comments on the video) for any other user to read. Comments are essentially public messages to the user having posted the video, as well as other users who have commented on the video.

The CAPTURE software also intuitively allows users to explore the network, allowing them to find and follow content that is relevant and enjoyable to them. Each user on the network has a custom profile, allowing each viewer to view it and get to know a little about the user before actually following them. Additional exploration through the CAPTURE SYSTEM comes into play within the "Explore" screen. The Explore screen within THE CAPTURE SYSTEM first shows users the top 50 videos that have been watched on the network. This allows the user to explore the most popular videos having been posted on the network, and ultimately follow these users for more enjoyable content to be viewed after posting in the future. Also included in the Explore tab is a full search component. Here, users may search for other users, and the most popular hashtags on the network. By going directly to a user profile (through search), or simply searching hashtags that interest you (ex: "sports"), the system allows users to find content that is most relevant and interesting to them.

The CAPTURE network also includes a full, built-in notification center, which is referred to as the "Activity" screen. The Activity screen is an intuitive GUI for managing and observing personal content that is supremely easy for users to understand without training or instruction. The Activity screen displays a chronological list of any activity taking place regarding the user's profile. For example, an activity post (which is driven dynamically by the server) might read: Your video: "My Beach Vacation" was just liked by User #1". These types of dynamic notifications allow users to know exactly when and what is going on with their profile and their friends.

The CAPTURE software also includes a video recorder and a video editor, which allow users to create stunning videos. The CAPTURE video capture and editor screens are simple enough for a younger child to use, yet intuitive enough for a professional film maker to work with. When a user opens the record screen, they are instantly ready to record their video. Recording is immediately activated, without further delay or user input required, as most moments when a user wants to record a video will be spontaneous and immediate. The user is able to record a video up to a full minute in length or able to select a previously recorded video (from their Photo Library) for use. After selecting one or the other, the user proceeds to the video editor.

The first screen within the video editor may be the "Filters" menu. Filters include color corrections that are applied to a video to stylize to enhance it in some way. For example, the "Black & White" filter strips all color from the video and leaves it looking black and white. After selecting a filter, the user proceeds to the music selection screen. Here, the user is able to select one song from their personal iTunes library (or other digital music library stored locally or available over a network, such as the Internet) to use as the background music of their video. After selecting the desired music track, the user may adjust the volume of both the video and the music (create independent volume profiles for the native audio and music track). A third track, such as a voice-over track, may also be added with an independent volume profile if desired.

The final step within the editor is the social settings screen. To begin, this screen is where the user adds a description to their video, tags other users who are relevant to the video and adds relevant hashtags. Next, the user may add a location as to where the video was created. For example, a video recorded at the Eiffel Tower might have the tagged location of "Paris, France" (should the user choose to add it, as this feature is optional). Finally, the user selects which social networks to share this video to (in addition to the CAPTURE network). The social accounts presented here will have previously been configured by the user in the applications settings panel, which allows us to provide "one-tap sharing". So instead of a user having to share to each network individually, the system allows them to easily share to up to 7, with just a few taps. After tapping "Post" on this screen, the video creation process is complete and the video will be posted to any and all selected networks.

Referring now to the figures, FIG. 1 is a functional block diagram of a distributed computer system 10 implementing a mobile video editing and sharing system. The system includes a local video creating device 12, such as a smartphone or tablet, running a mobile video editing and sharing application program 14, such as the CAPTURE app. Although one local video creating device 12 is shown, any number of local video creating devices may operate similarly. The local video creating device 12 allows the user to record or download video files and the edit the video files including the ability to add music to video files. The user may also control the music volume of the course of the video file, for example for "fade in" and "fade out" effects. Additional editing features as described above are also supported (color filter, speed, reverse, and so forth).

Completed video files may be uploaded to a server or cloud based storage 16, which maintains a library 18 of published video files for the user. Many users may create video libraries and each user may create and organize a number of libraries. The users may also download or authorize the download of video files to a variety of social media network 20A-N, where they can be viewed with a compatible video playing application 22 typically running in a browser environment. The users may also download or authorize the download of video files to a variety of individual video receiving devices 24A-N, where they can be viewed with a compatible video playing application 26 typically running in a browser environment. For example, the video files may be downloaded to smartphones, tablets, laptop computers, and so forth.

Figure 2A:
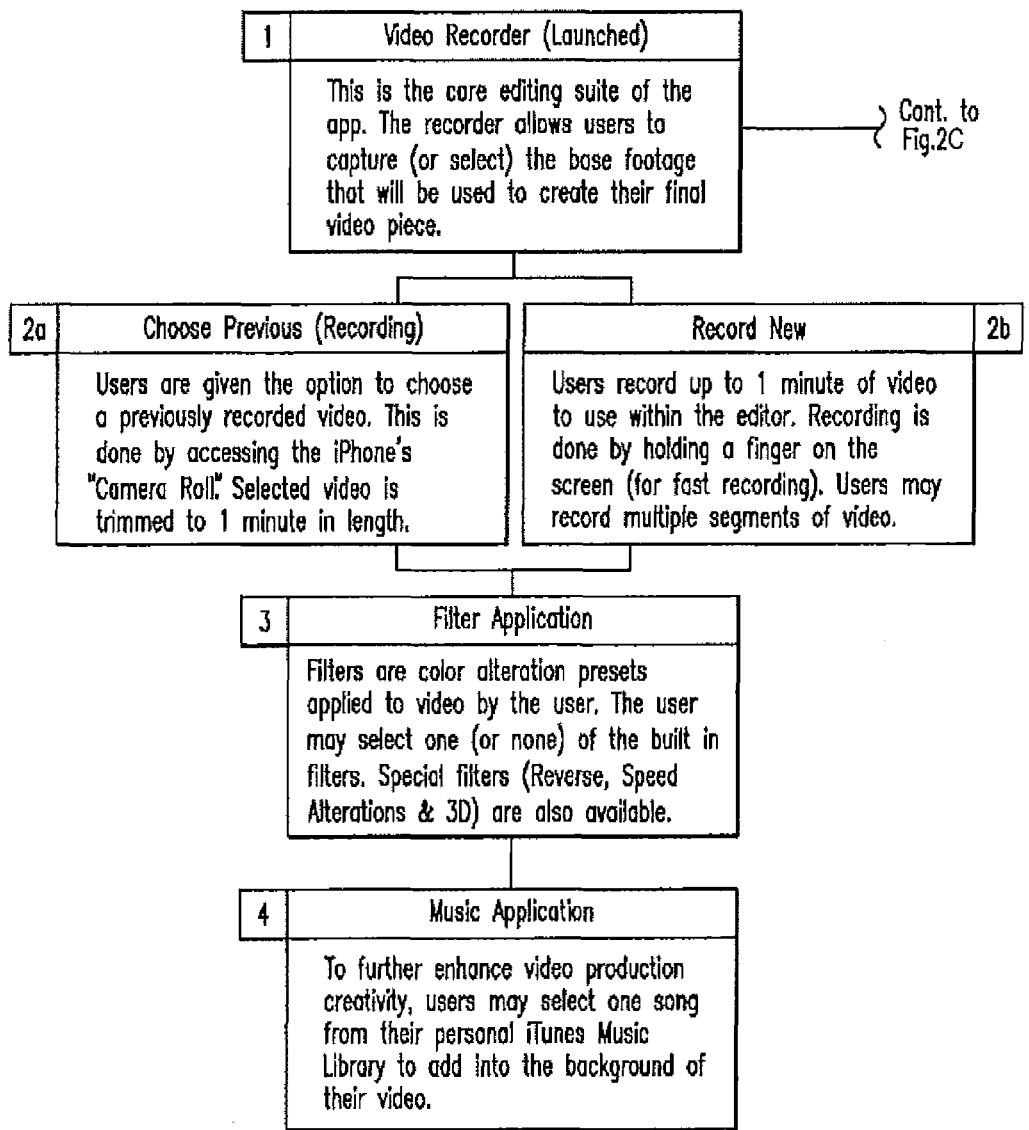
FIG. 2A is a logic flow diagram for operating the mobile video editing and sharing system.

FIG. 2A is a logic flow diagram for operating the mobile video editing and sharing system. In block 1, the video recorder is launched on the host device (e.g., smartphone, tablet, etc.) in response to a predefined user command, such as touching the CAPTURE icon on the user's smartphone screen. This opens the core editing suite of the CAPTURE application. The recorder allows the user to capture (record) or select (open previously stored) base video footage that may be used to create a final video file. Block 1 may be followed by blocks 2a and/or 2b through user selection (e.g., touch screen item selection). In Block 2a, the user has the option of choosing a previously stored video recording. On an iPhone, for example, this may be accomplished by accessing the hose iPhone's "Camera Roll" icon. In this particular embodiment, the selected video is automatically trimmed to the first one minute in length. In Block 2b, the user has the option of recording up to one minute of new video. For example, the recording command may be entered by holding a finger on the screen host device (for fast recording). User may remove their finger to stop recording, and tough the screen again to resume recording, until the full minute (or other recording limit) has been reached. As an alternative, the recording limit may be a user defined parameter.

Figure 2B:
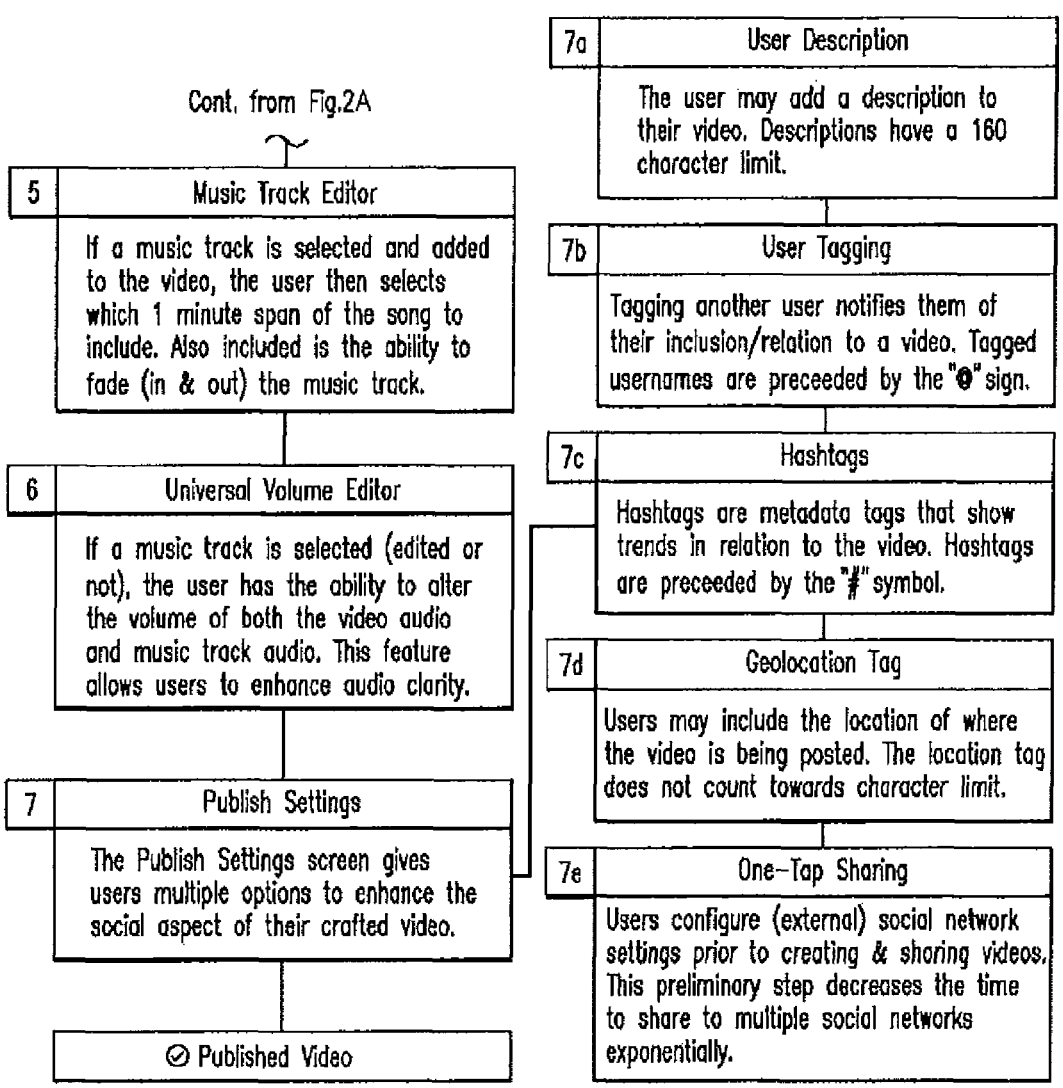
FIG. 2B is a logic flow diagram for edited video sharing with the mobile video editing and sharing system.

Blocks 2a and 2b are followed by block 3, in which the filter application is launched in response to a user command. User selectable filters include color alteration, reverse, speed alteration (increase and decrease video speed), and 3D effects as described previously. Block 3 is followed by block 4, in which the music application is launched in response to a user command, which allows the user to select a music track for adding to the selected video. Block 4 is followed by block 5 (see FIG. 2B), in which the music track editor is launched in response to a user command, which allows the user to select a desired portion of the song (i.e., the start location of the music track) to add the video. The length of the music track is automatically trimmed to match the length of the video, up to one minute in this example. Additional music footage is stored to allow longer music play time when the video is played at a slower speed or the reverse function is used. User controls also provide for fading in and fading out the music track.

Block 5 is followed by block 6, in which the universal volume editor is launched in response to a user command. If a music track is selected (whether the music track has been edited or not) the universal volume editor allows the volume of the video audio and the volume of the music track to be edited separately. This allows the user to enhance the audio clarity, for example by turning down the music, and turn up the audio recorded during creation of the underlying video (referred to as the "native audio"), when the user wants to viewer to hear the voices on the native video. At another point, the music volume may be turned up for dramatic effect, for example while the volume on the native video is turned down or muted to improve the music clarity. As another option, the user may be able to record or select a pre-recorded "voice over" as a third track with a volume that can also be individually controlled, resulting in three sound tracks (native audio track, music track, and voice over track), each with and independently controlled volume profile, playing on the same piece of video.

Block 6 is followed by block 7, in which publication settings are launched in response to a user command, which allow the user to select one or more social media sites, mailboxes, text addresses, or other destinations to which the edited video is published. A variety of social medial publication features are provided to enhance the social aspects assigned to the crafted video. For example, in block 7a the user may add a text description to the edited video (e.g., up to 160 characters in this particular embodiment). In block 7b, the user may add one or more tags (also referred to as metadata or metatags) to the edited video. For example, tagging may be used to notify another user that their image, voice or music is included in the video (tagged usernames are preceded by the @ sign in this particular embodiment). In block 7c, the user may add one or more hashtags that show trends in relation to the video (hashtags are preceded by the # sign in this particular embodiment). In block 7d, the user may add one or more geolocation tags that are typically used to indicate the geographic location where the video was recorded. In block 7e, the user may launch a one-tap sharing feature, which allows the user to associate a publication (distribution) list to the video with a single click. The greatly reduces the time required to share the video with multiple social media recipients in different networks.

Figure 2C:
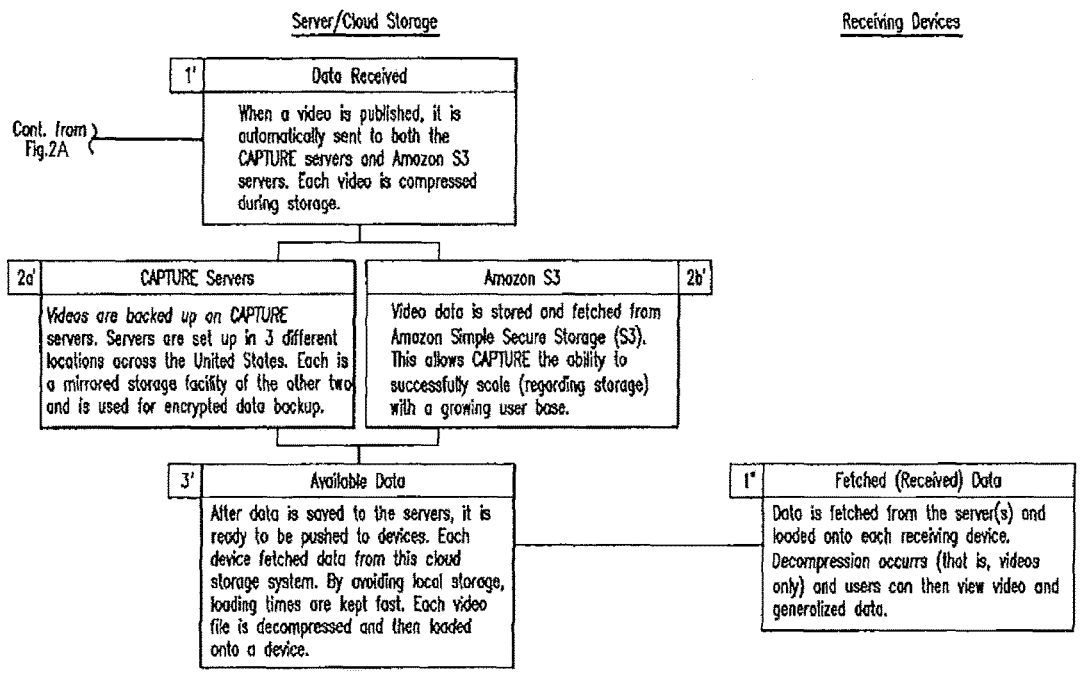
FIG. 2C is a logic flow diagram for edited video sharing with the mobile video editing and sharing system.

FIG. 2C (continued from 2B) is a logic flow diagram for edited video sharing with the mobile video editing and sharing system. On the server or cloud storage side, in block 1' a published video is automatically sent to a storage location. In this particular example, the published video is automatically sent to the CAPTURE server and an Amazon S3 server. Each video is typically compressed during storage. In block 2a', the CAPTURE site backs up all saved videos. In this particular embodiment, the system uses three backup servers in three different locations across the United States where encrypted backups are mirrored. In block 2b' the Amazon S3 site backs up all saved videos. In block 3' the data stored on the backup servers is available to be pushed to user devices (e.g., smartphones, tablets, websites, social media sites, etc.). Each user device fetches data from the cloud storage system to avoid multiple downloads from the creator's host device. The keeps downloading times low, frees up the hoist device from multiple downloads, and leverages to compression and encryption facilities of the cloud storage system.

Videos are typically stored to both the CAPTURE storage and the Amazon S3 (simple secure storage) system. While the Amazon S3 storage system provides additional storage capacity for scaling up in the event that the CAPTURE site becomes saturated. Each storage system provides multiple functions that the other may also provide, while each system may have a different main or target function. For example, the primary purpose of the CAPTURE servers may be to provide a backup location for any and all data generated by the CAPTURE apps running on user host devices and serve as the default retrieving location in the event of a failure of a user host device. The primary purpose of the Amazon S3 backup may be to provide quick data access to the CAPTURE apps running on host devices for fetching and loading on the users' timelines.

Figure 3:
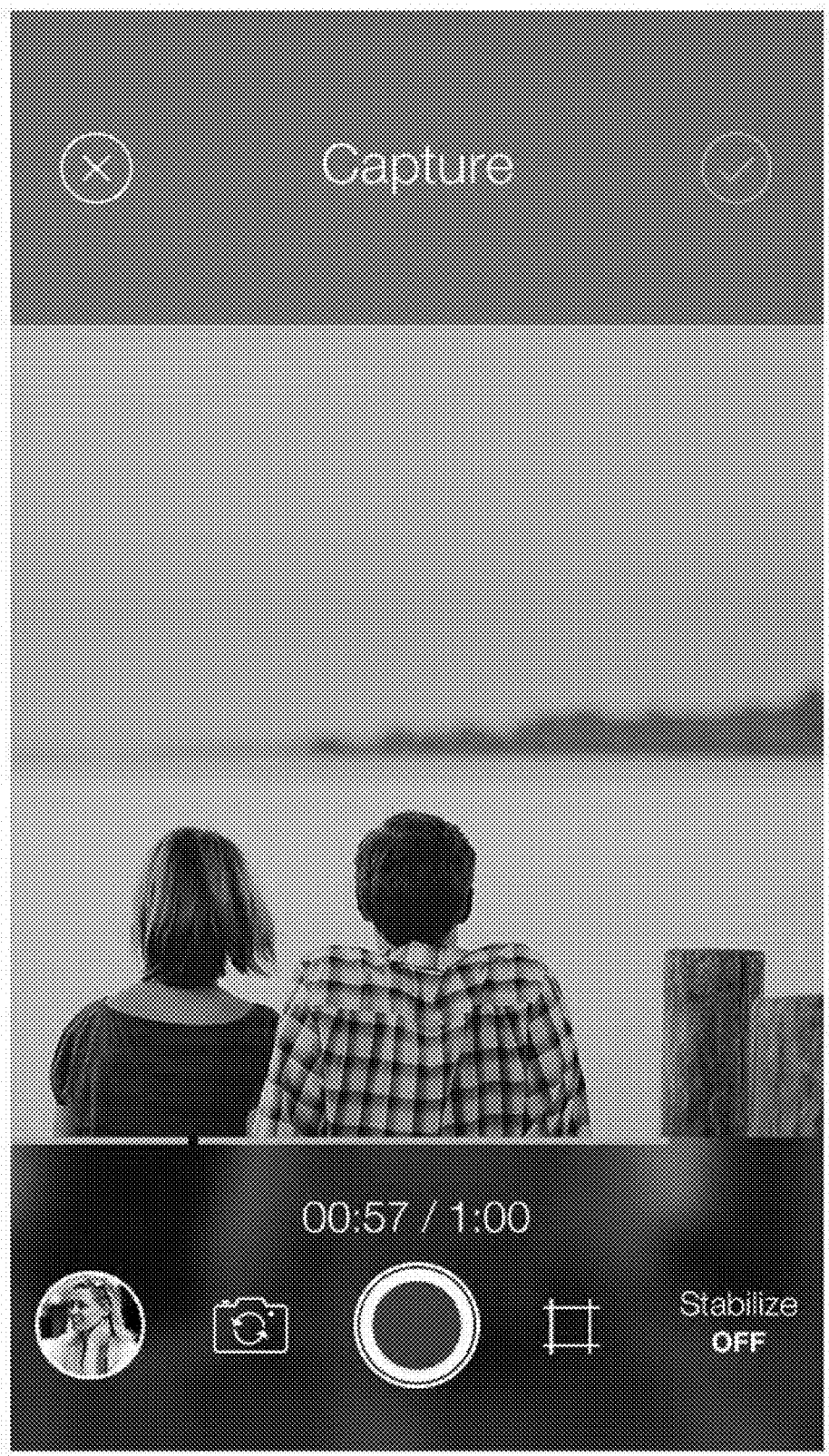
FIG. 3 is a first example graphic user interface screen for an illustrative the mobile video editing and sharing system.

FIGS. 3-22 are example graphic user interface screens for an illustrative embodiment of the mobile video editing and sharing system. The functionality of the various blocks are shown in each block and summarized below. FIG. 3 is a user interface showing a "Popular" tab that allows users to explore the most popular (watched) videos on the network (located below the search bar, seen here). Users may also explore the CAPTURE network by searching for other users or hashtags using the search bar function.

Figure 4:
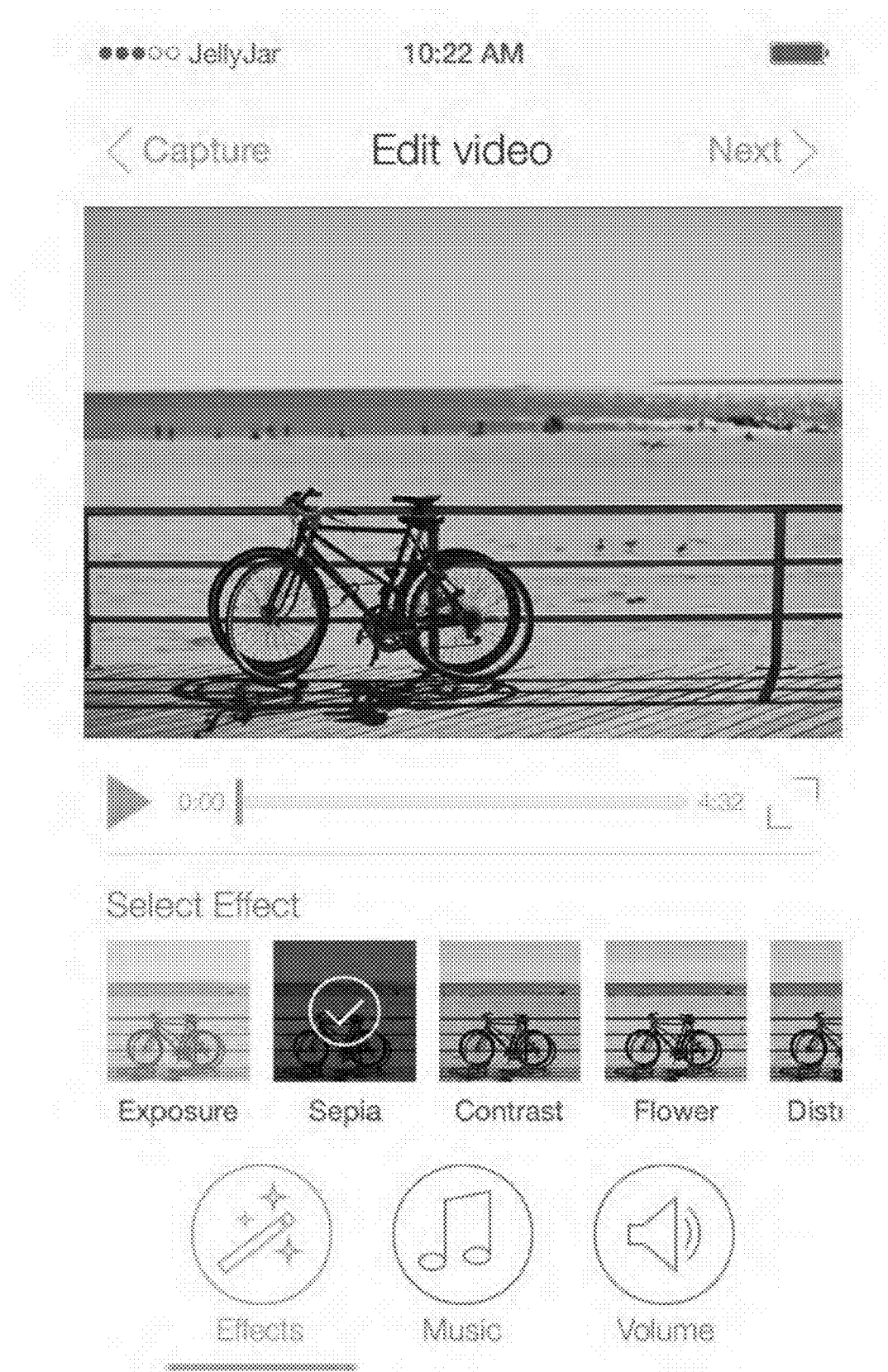
FIG. 4 is another example graphic user interface screen for an illustrative the mobile video editing and sharing system.

FIG. 4 is a user interface showing first screen of the Video Editor. This screen is where users may select a filter to alter the color of their video (filters are presented as thumbnails underneath the video). The video preview is seen as the first element within the editor, this is where the user may see how the video with the applied filter will look. The play button below it controls the play/pause functions and the double arrow icon to the right of the menu controls the expansion of the video into full screen mode. Finally, various sub menus of the editor are accessed through the menu icons on the bottom of the screen.

FIG. 5 is a user interface showing the main timeline for a CAPTURE user. The timeline loads videos posted by other users the viewing user is following in chronological order. Metadata for the posted video is displayed in the top with the posting users profile photo, with the description, and options to "Like", "Comment" and/or "Report as Inappropriate" placed below.

Figure 6:
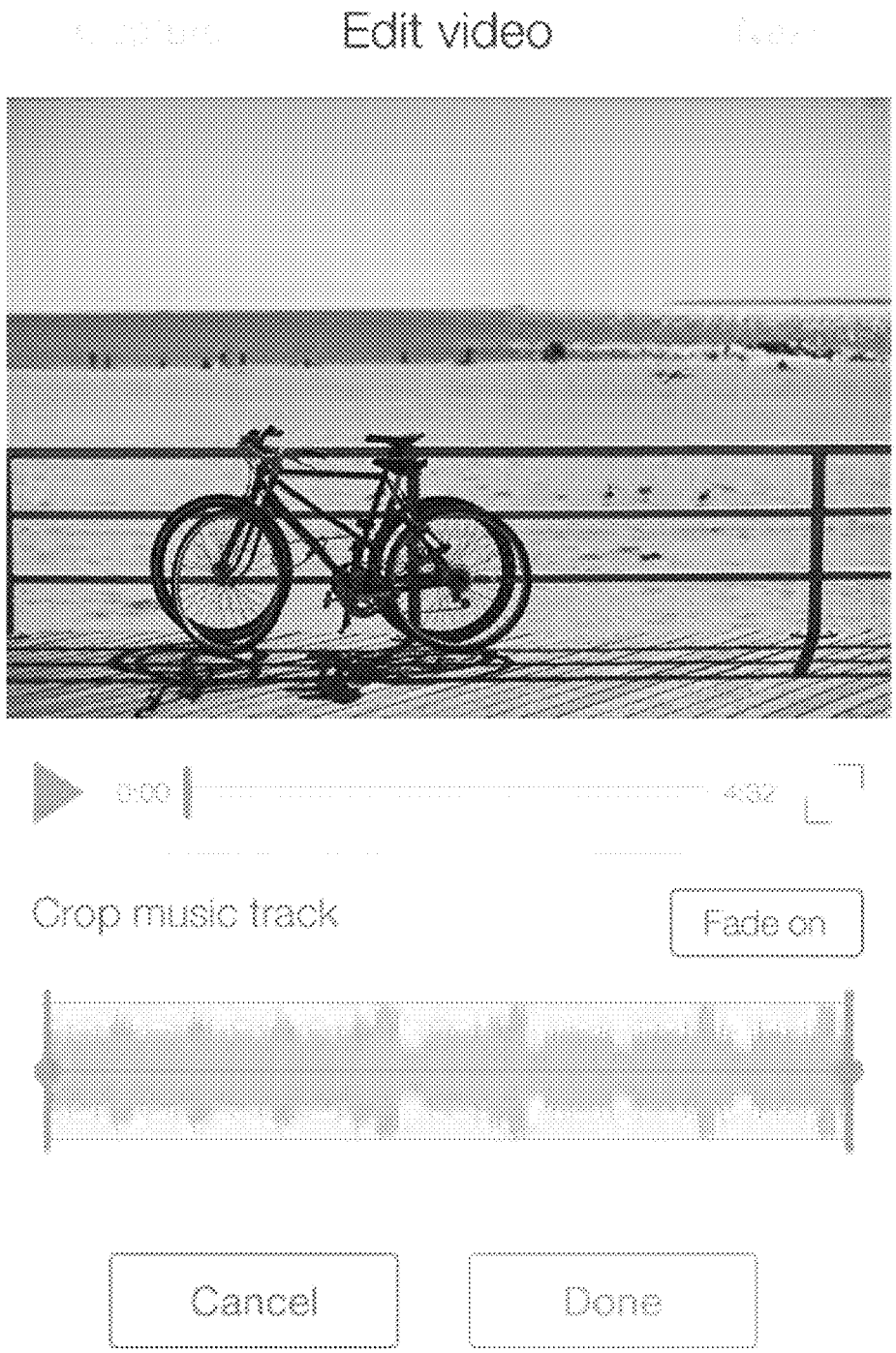
FIG. 6 is another example graphic user interface screen for an illustrative the mobile video editing and sharing system.

FIG. 6 is a user interface showing a list of recent activity within their app by accessing the "Activity" screen. This list shows all activity that may happen associated with any given CAPTURE profile.

Figure 7:
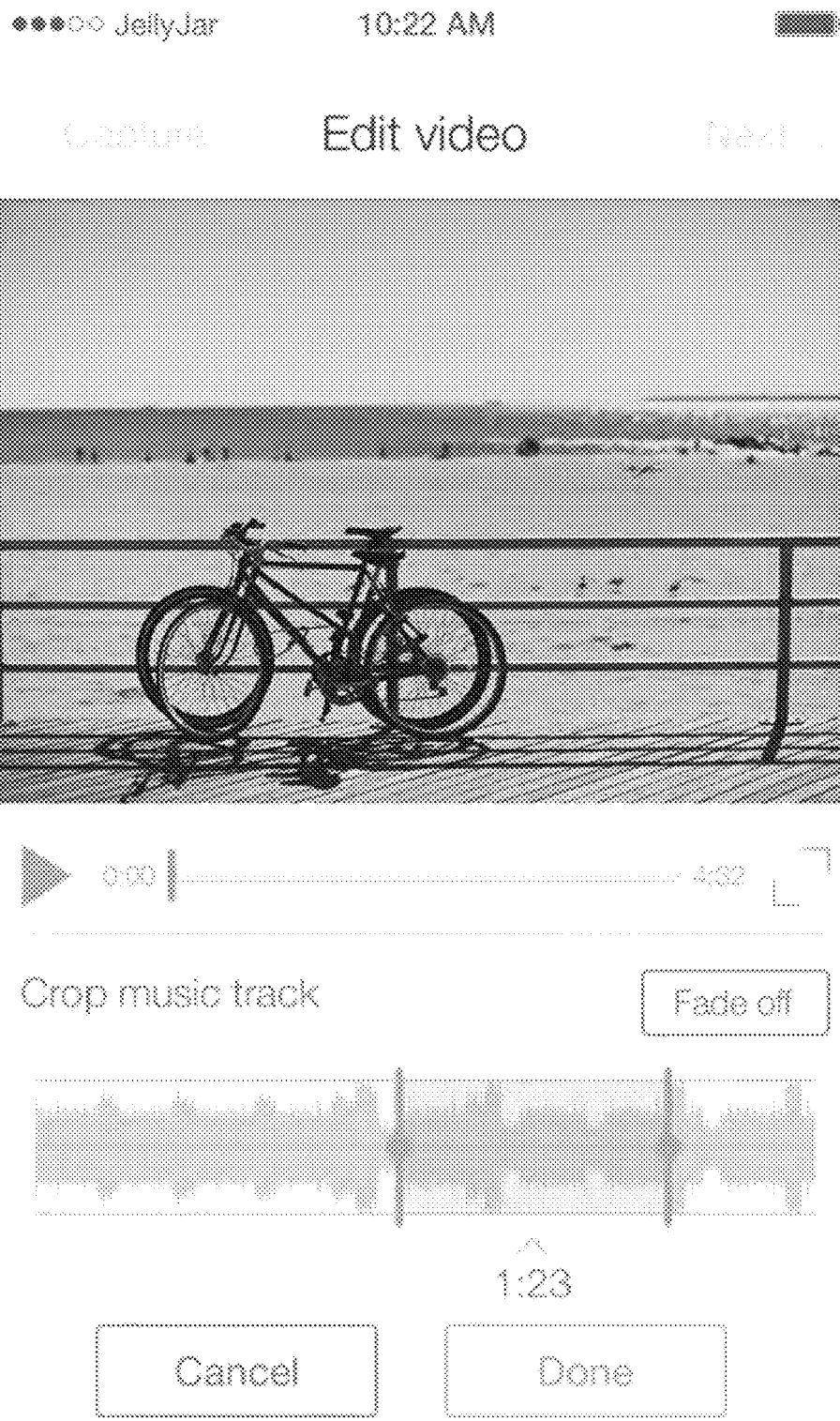
FIG. 7 is another example graphic user interface screen for an illustrative the mobile video editing and sharing system.

FIG. 7 is a user interface allowing the user to select a music track. The user may edit the length of the track to match the length of their recorded/chosen video. This is done by adjusting the sliders on either end of the displayed track. Users may also fade the track at the beginning and end by tapping the "Fade" button.

Figure 8:
FIG. 8 is another example graphic user interface screen for an illustrative the mobile video editing and sharing system.

FIG. 8 is a user interface showing the Universal Volume Editor, which allows a user to alter the volume of both the selected music track and original video audio.

Figure 9:
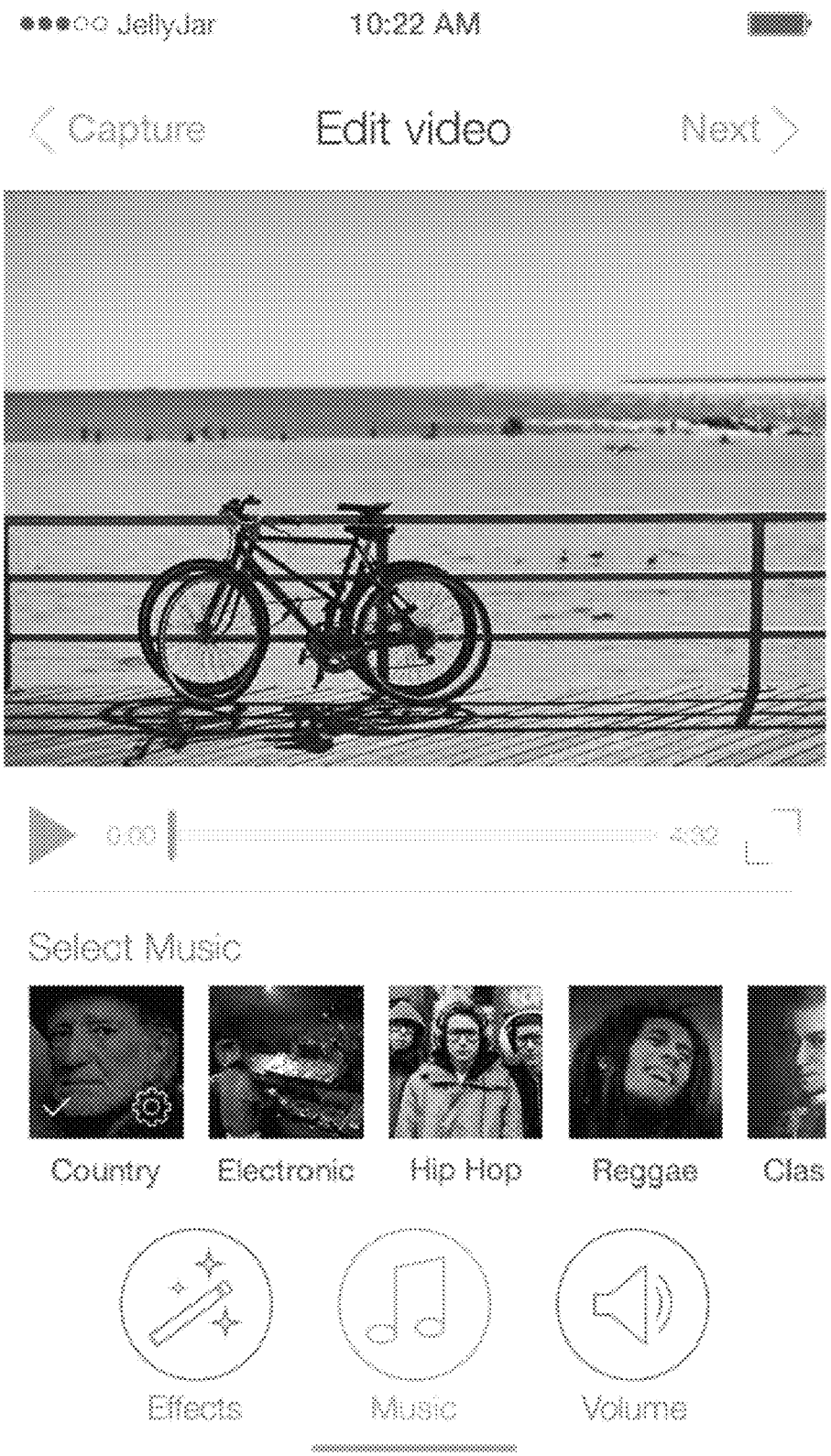
FIG. 9 is another example graphic user interface screen for an illustrative the mobile video editing and sharing system.

FIG. 9 is a user interface showing a public profile for a CAPTURE user. This typically includes a profile image, display name, location and biography. The counters below show how many followers the user has, how many people the user is following, and the number of videos the user has posted. Finally, all videos posted by the user are displayed below the above listed data. Also, the ability to follow the user being viewed may be done by tapping the "Follow" button in the top right.

Figure 10:
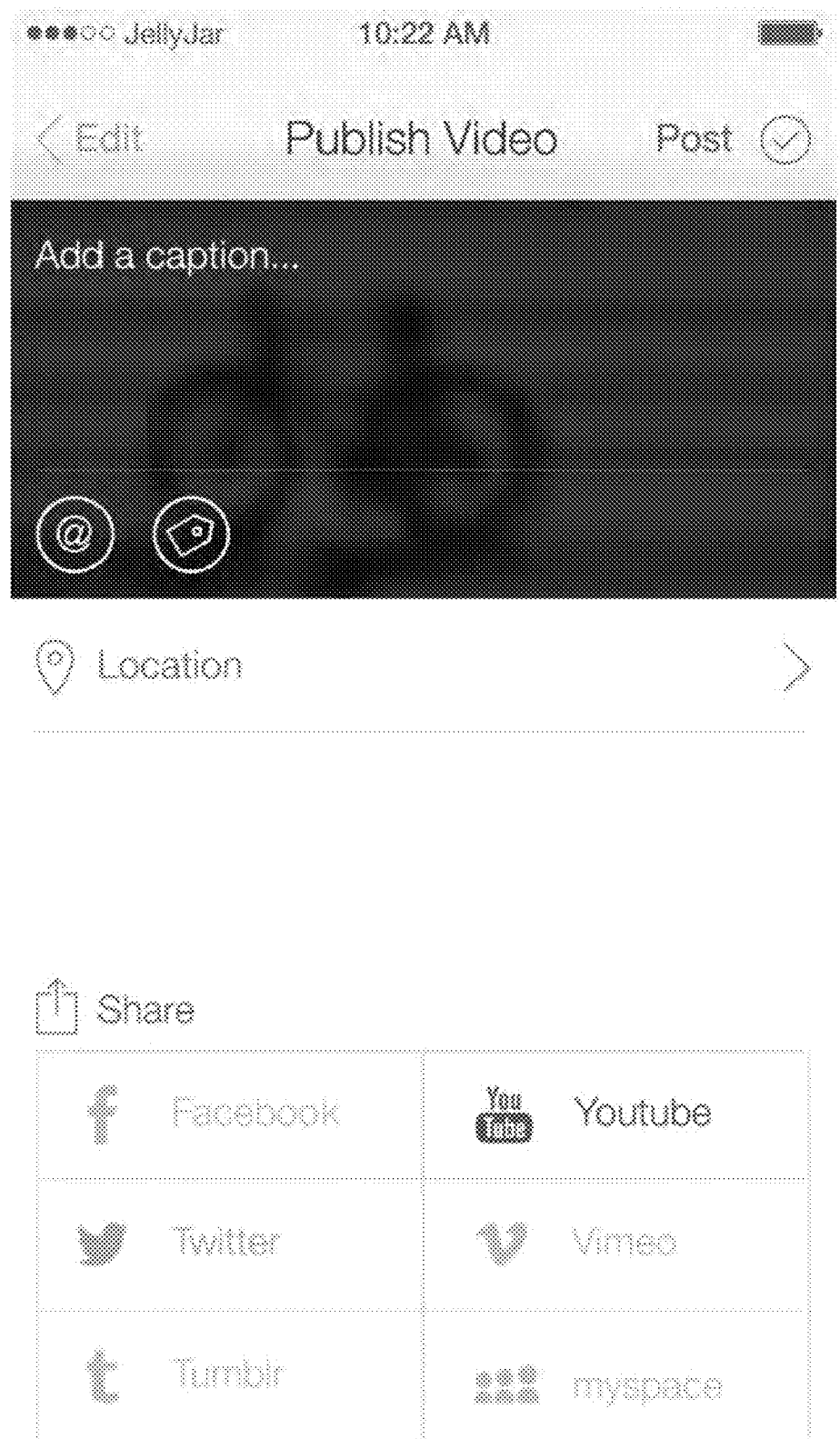
FIG. 10 is another example graphic user interface screen for an illustrative the mobile video editing and sharing system.

FIG. 10 is a user interface for editing a video, the user may add a description, tag users, add hashtags, add a location and select which external social networks to share to. This is where the "One-Tap Sharing" selection item is located.

Figure 11:
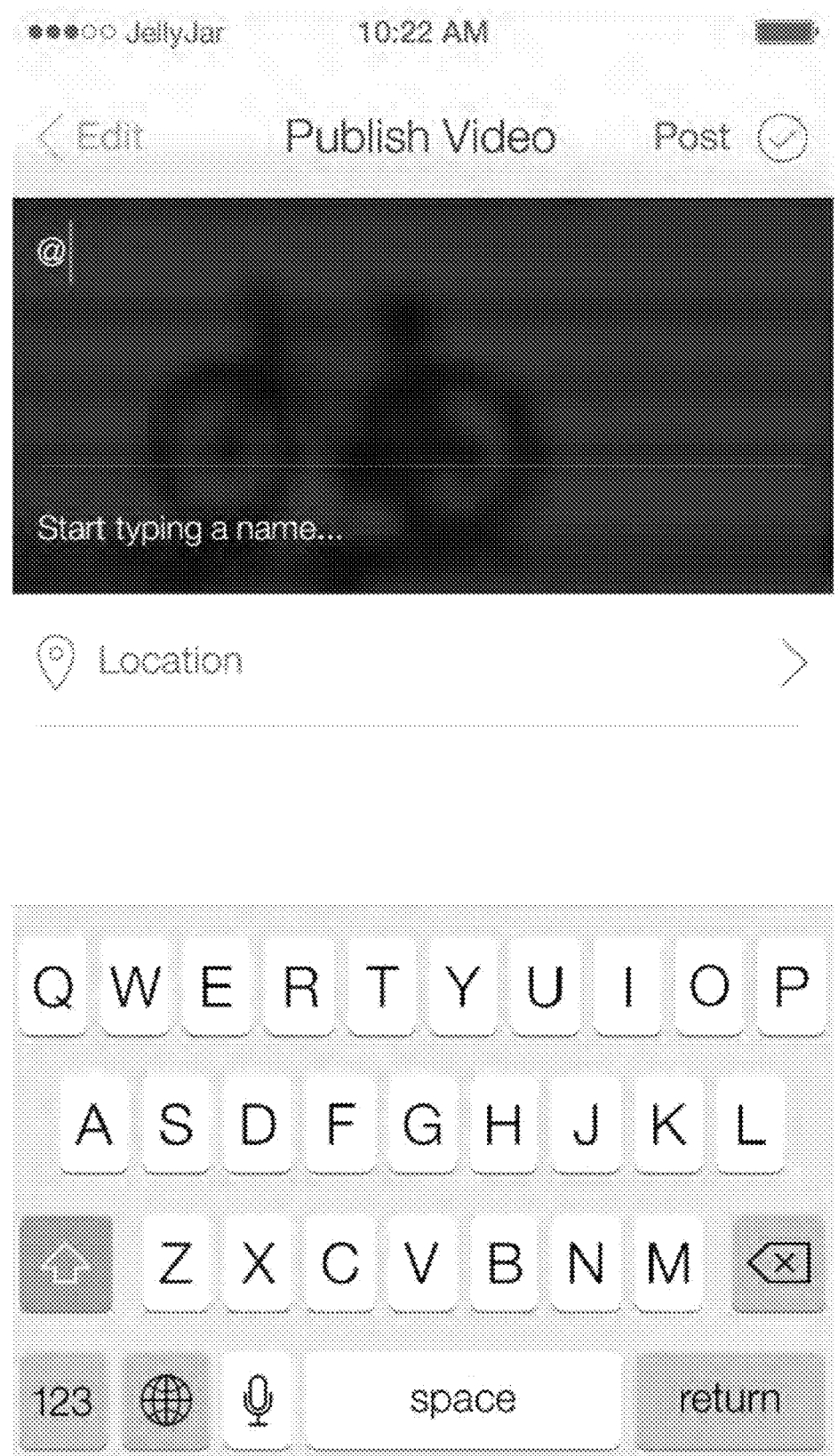
FIG. 11 is another example graphic user interface screen for an illustrative the mobile video editing and sharing system.

FIG. 11 is a user interface that allows a user to tap the "#" symbol to add a hashtag. The most popular hashtags related to the first letter they type are displayed in the bottom of the description screen. This is an automated process included to give users quick access to the hashtags they want to add in their videos.

Figure 12:
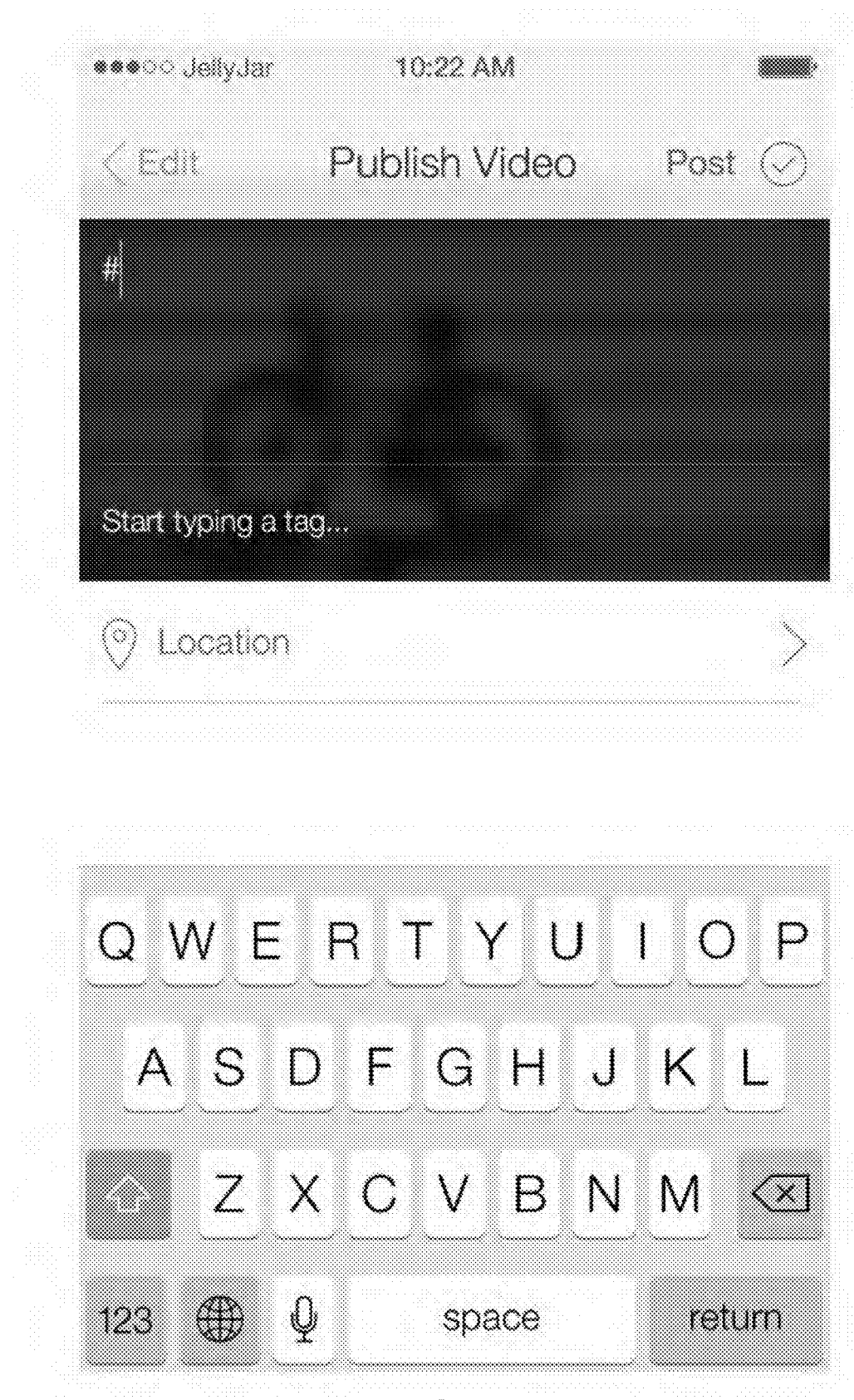
FIG. 12 is another example graphic user interface screen for an illustrative the mobile video editing and sharing system.

FIG. 12 is a user interface that allows the user to tap the "@" symbol to tag a user. The most relevant users related to the first letter they type will be displayed in the bottom of the description screen. This is an automated process included to give users quick access to tagging the users they want to add in their videos.

Figure 13:
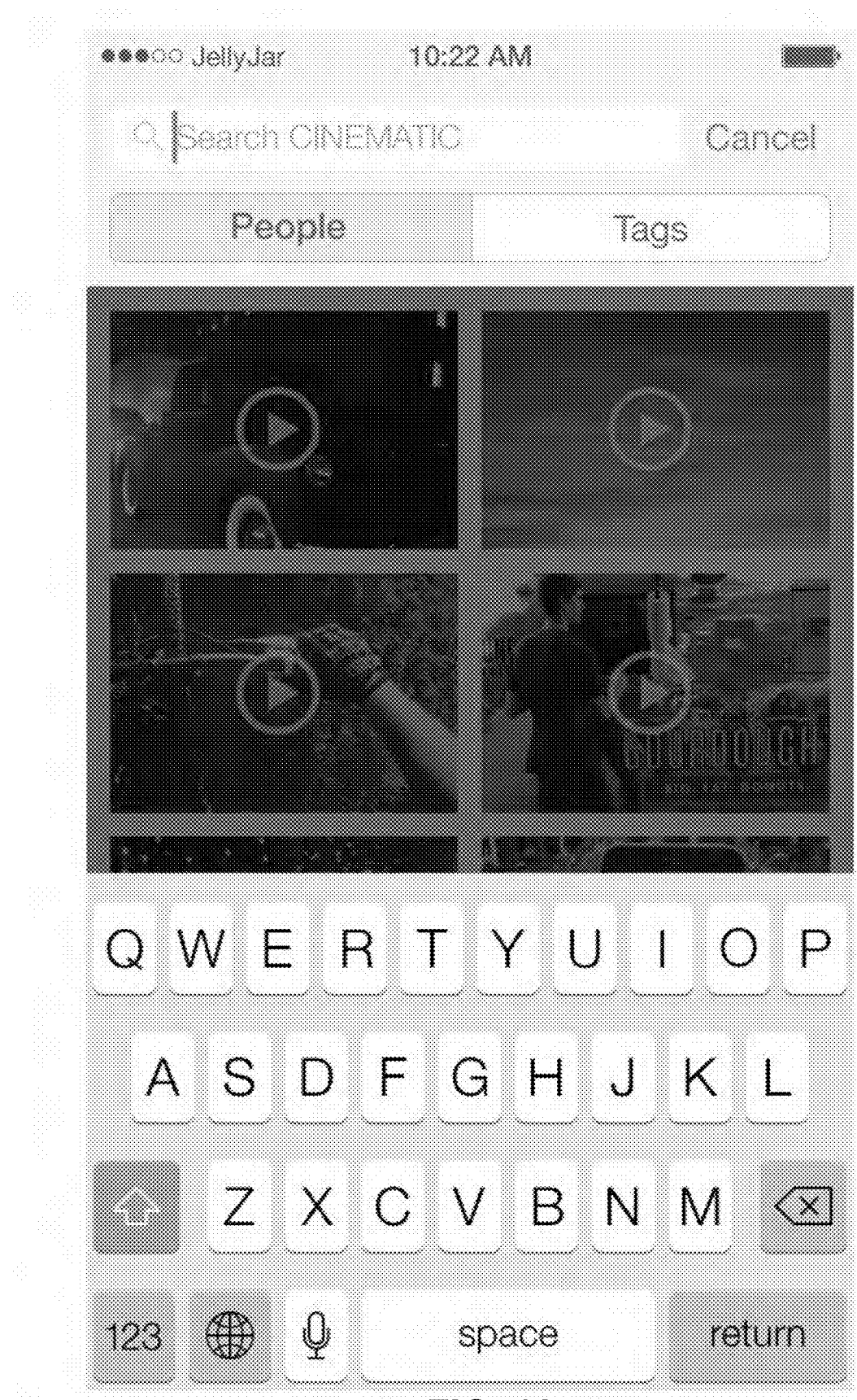
FIG. 13 is another example graphic user interface screen for an illustrative the mobile video editing and sharing system.

FIG. 13 is a user interface that allows a user to tap on the "Music" sub menu icon within the Video Editor. This brings up a system of user interface screens for selecting music from their personal iTunes Library. The selection process is presented in the same menu style that the iTunes application within iOS uses (i.e. music is categorized into: Playlists, Albums, Artists, & Songs).

Figure 14:
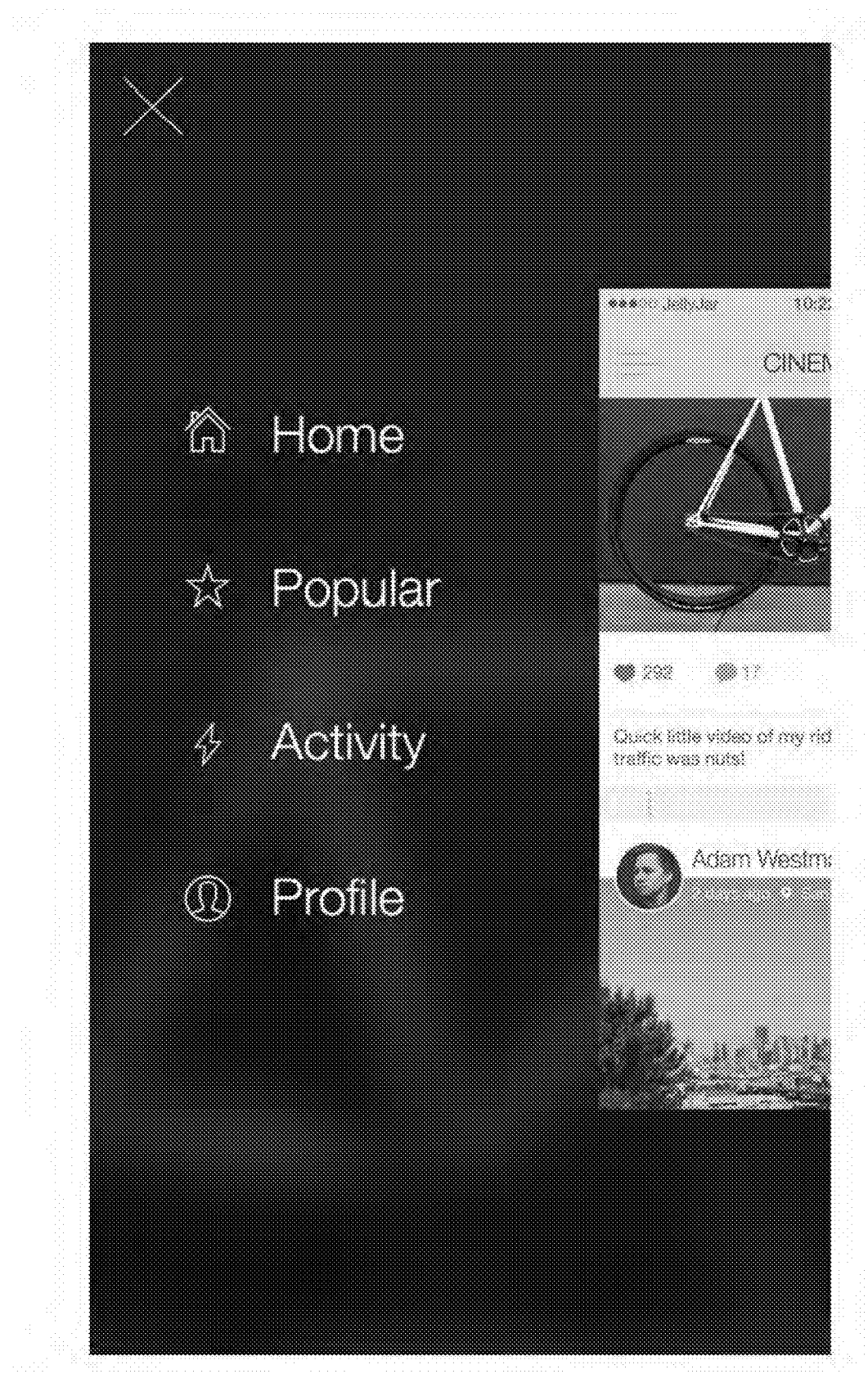
FIG. 14 is another example graphic user interface screen for an illustrative the mobile video editing and sharing system.

FIG. 14 is a user interface that allows a user to tap in the top left of the application. This prompts access to the main menu of the app. The timeline screen shrinks and floats to the right, revealing the available menu items on the left.

Figure 15:
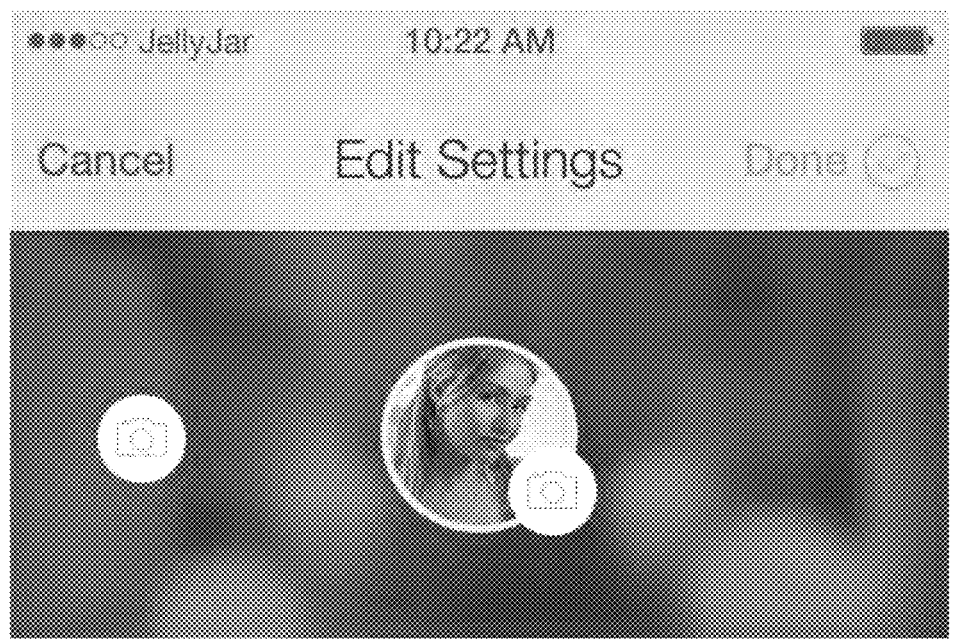
FIG. 15 is another example graphic user interface screen for an illustrative the mobile video editing and sharing system.
Figure 18:
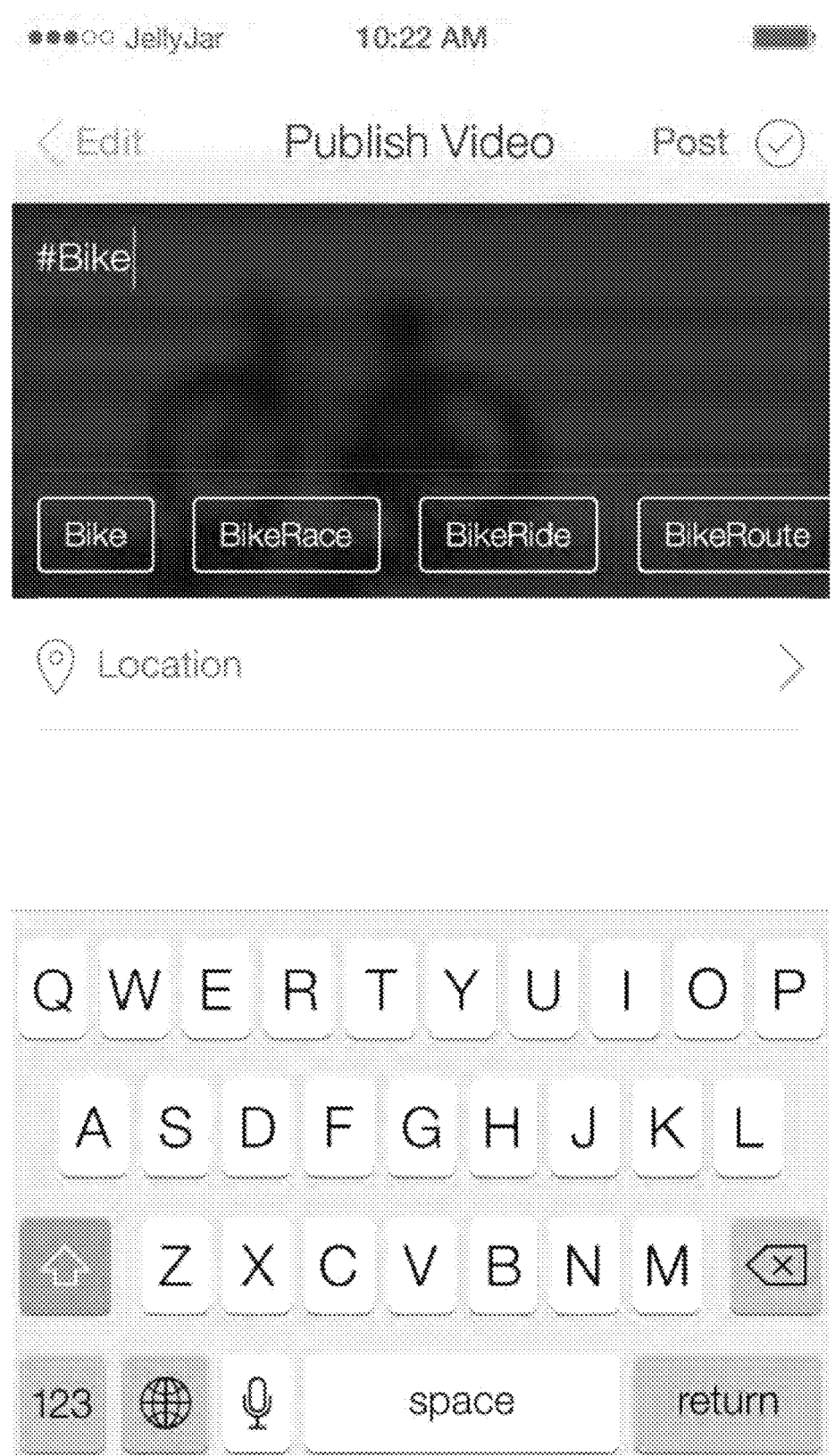
FIG. 18 is another example graphic user interface screen for an illustrative the mobile video editing and sharing system.
Figure 19:
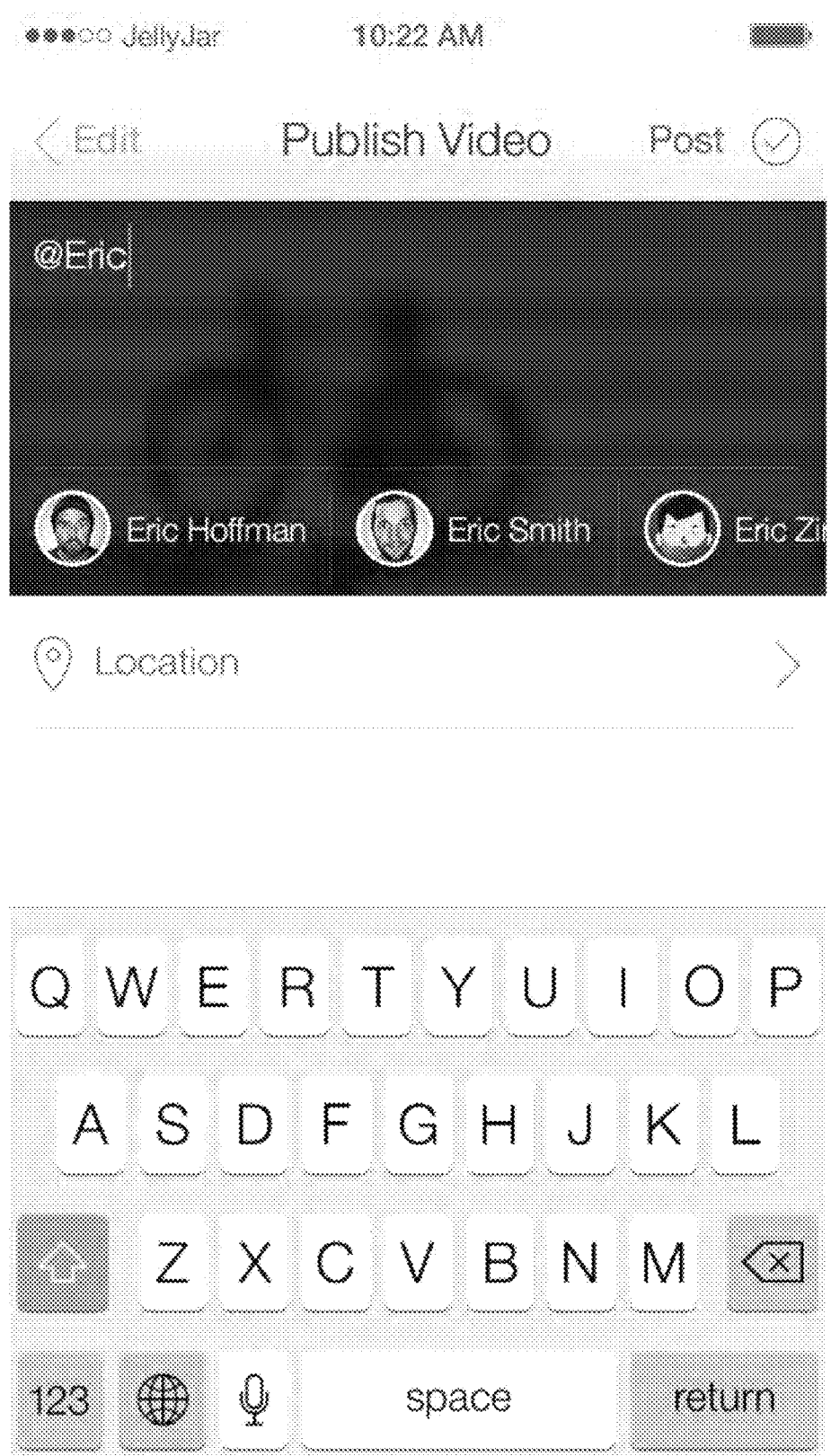
FIG. 19 is another example graphic user interface screen for an illustrative the mobile video editing and sharing system.
Figure 20:
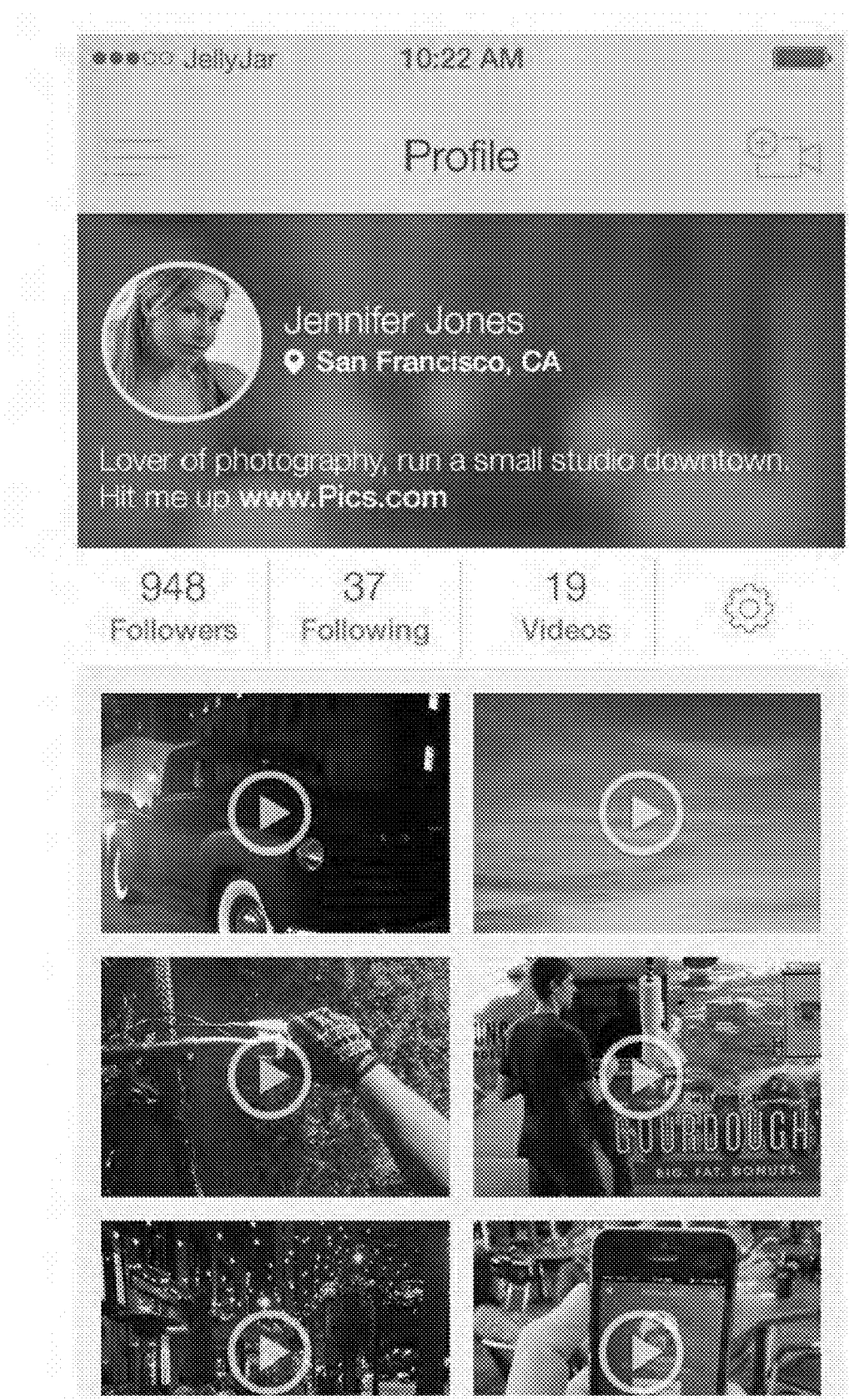
FIG. 20 is another example graphic user interface screen for an illustrative the mobile video editing and sharing system.
Figure 21:
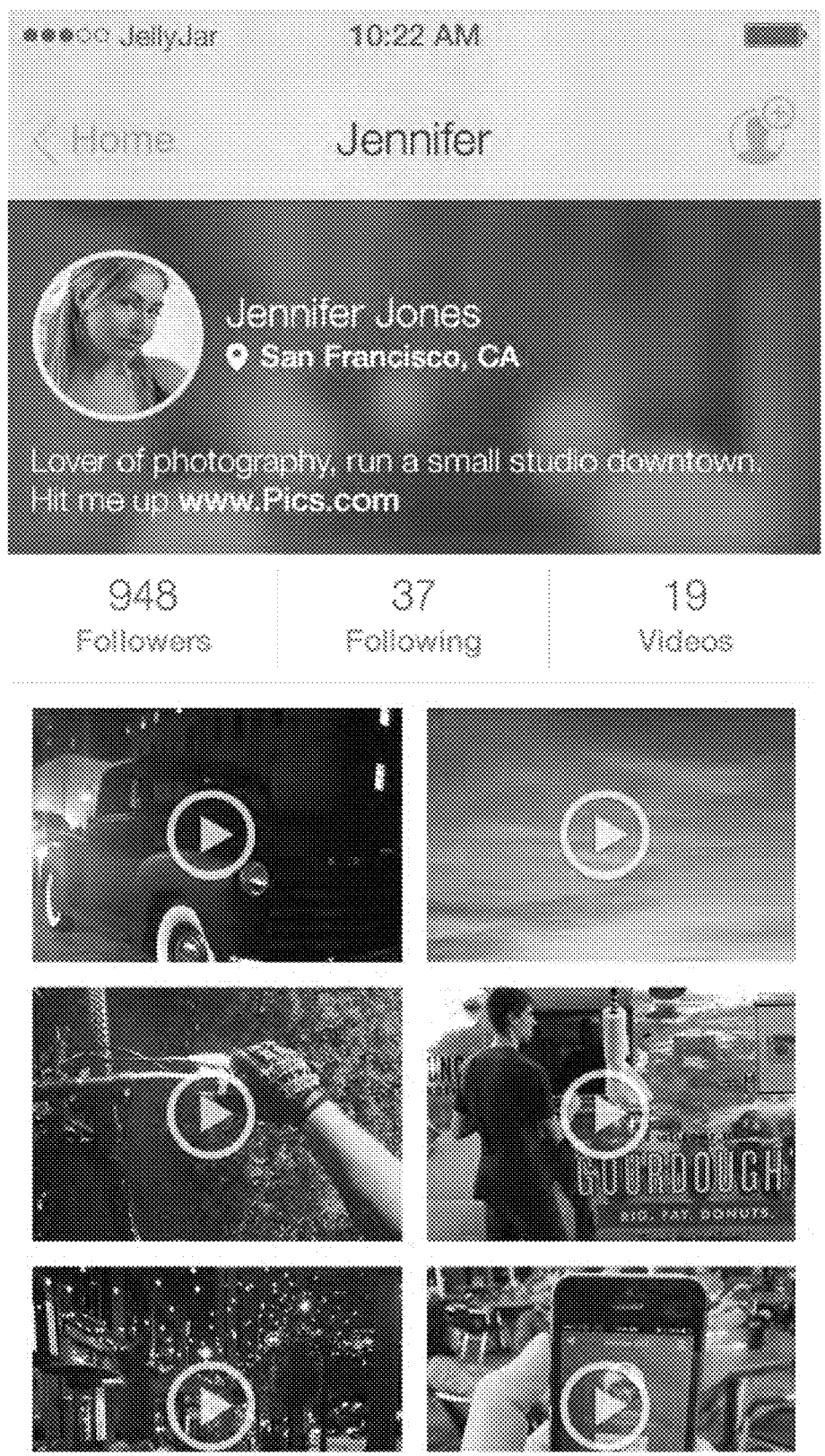
FIG. 21 is another example graphic user interface screen for an illustrative the mobile video editing and sharing system.
Figure 22:
FIG. 22 is another example graphic user interface screen for an illustrative the mobile video editing and sharing system.

FIG. 15 a user interface where users may edit their profile information through the Settings screen (displayed here. Users may change their profile photo, header image, general information, and make their videos private. Making videos private will mean not every user on the CAPTURE system may view your profile and/or videos. In order to view them, the user typically submits a follow-up request to obtain approval before seeing the private profile.

FIG. 16 a user interface that is displayed after a user to taps on the comment counter on a video, the user is taken to the Comments screen, seen here. This displays any comment posted with the video, or associated with it. Users also have the ability to type and post a comment on the associated video.

Figure 17:
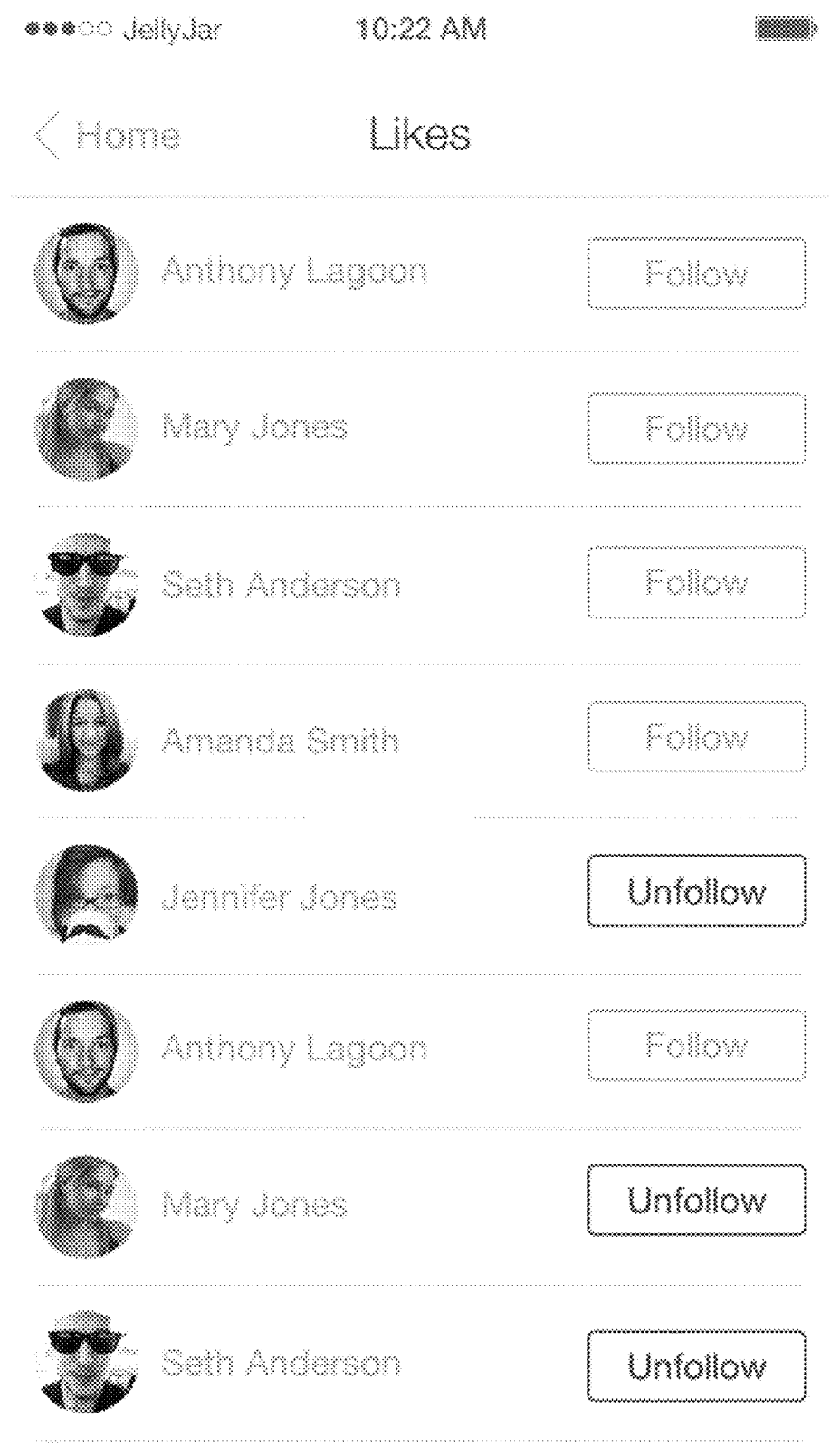

FIG. 17 a user interface that allows a user to tap for viewing the "Likes" on a video or a list of users (navigated to through the profile screen), buttons are displayed to follow a user (you are currently not following), and a button to "unfollow" a user (whom the user is currently following). FIGS. 18-22 are additional user interface screens displaying their functional options.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable pro gram code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for editing a video file on a portable computing device, comprising:

receiving a video file comprising visual content and a native audio track recorded during creation of the visual content;

receiving a selection of a stored digital music track;

receiving a music start indicator for syncing a selected portion of the stored digital music track to play in association with playing of the video;

receiving a video start indicator associated with the video file for syncing the video file with the selected portion of the digital music track, automatically trimming the music track after the music start indicator to match a remaining portion of the video file after the video start indicator, and storing the trimmed music track in association with the video file;

displaying a native audio volume control item operative for controlling the volume of the native audio track while displaying the visual content;

receiving a first volume control profile for controlling the native audio track in association with playing of the video through user operation of the native audio volume control while playing the native audio track together with the visual content;

displaying a music track volume control item operative for controlling the volume of the music track while displaying the visual content;

receiving a second volume control profile, independent of the first volume control profile, for controlling the selected portion of the stored digital music track in association with playing of the video through user operation of the music track volume control while playing the music track together with the visual content;

creating an edited video file for simultaneously playing the visual content, the native audio track adjusted by the first volume control profile, and the music track adjusted by the second volume control profile;

receiving a selection of a stored publication list comprising one or more digital publication targets; and publishing the edited video file to the publication list.

2. The method of claim 1, further comprising:
receiving a voice-over track;
receiving a third volume control profile, independent of the first and second volume control profiles, for controlling the voice-over track in association with playing of the video;
creating a second edited video file for simultaneously playing the visual content, the native audio track adjusted by the first volume control profile, the music track adjusted by the second volume control profile, and the voice-over track adjusted by the third volume control profile; and
storing the voice-over track adjusted by the third volume control profile as part of the edited video file.

3. The method of claim 1, further comprising:
storing an additional section of the music track;
receiving a speed filter command and, in response to the reverse filter command, playing a portion of the visual content at an altered speed while playing the music track at an unadjusted speed;
storing the visual content adjusted by the speed filter while playing the music track at an unadjusted speed as part of the edited video file;
wherein, if the altered speed is slower than normal speed, playing a portion of the additional section of the music track in association with the visual content at the slower speed to accommodate the difference in speeds between the visual content and the music track.

4. The method of claim 1, further comprising:
storing an additional section of the music track;
receiving a reverse filter command and, in response to the reverse filter command, playing a portion of the visual content in a reverse order while playing the music track in a forward order;
playing a portion of the additional section of the music track in association with the visual content to accommodate additional run time for the portion of the visual content played in the reverse order;
storing the visual content adjusted by the reverse filter while playing the music track in a forward order including the portion of the additional section of the music track to accommodate the additional run time for the portion of the visual content played in the reverse order as part of the edited video file.

5. The method of claim 1, further comprising:
receiving a 3D filter command and, in response to the speed filter command, playing a portion of the visual content altered by the 3D filter; and
storing the visual content adjusted by the 3D filter as part of the edited video file.

6. The method of claim 5 wherein the 3D filter comprises overlaying a 3D effect on the visual content configured to function with red/blue 3D glasses.

7. The method of claim 1, further comprising automatically storing the edited video file to a network or cloud storage location in association with publication of the edited video file.

8. The method of claim 7, further comprising automatically storing the edited video file to a second network or cloud storage location in association with publication of the edited video file.

9. The method of claim 1, further comprising receiving one or more metadata tags and storing the metadata tags in association with the edited video file, wherein at least one of the metadata tags identifies a person appearing in the visual content, a source of the music track, or a source of a voice-over track associated with the edited video file.

10. The method of claim 1, further comprising receiving a hashtag indicating social media trending information and storing the hashtag in association with the edited video file.

11. The method of claim 1, further comprising receiving a geolocation tag indicating a geographic location associated with the edited video file and storing the geolocation tag in association with the edited video file.

12. The method of claim 1, further comprising receiving a textual description of the content of the edited video file and storing the textual description in association with the edited video file.

13. The method of claim 1, further comprising displaying the native audio volume control item comprising a slider control item.

14. The method of claim 12, further comprising displaying the music audio volume control item comprising a slider control item.

15. The method of claim 13, further comprising simultaneously displaying the native music and music audio control items together with displaying the visual content, and receiving the native audio volume profile and the music volume profile through user operation of the native music and music audio control items while displaying the visual content.

16. A non-transitory computer storage medium storing instructions executable by a computer to cause the computer to perform a method for editing a video file on a portable computing device, the method comprising:
receiving a video file comprising visual content and a native audio track recorded during creation of the visual content;
receiving a selection of a stored digital music track;
receiving a music start indicator for syncing a selected portion of the stored digital music track to play in association with playing of the video;
receiving a video start indicator associated with the video file for syncing the video file with the selected portion of the digital music track, automatically trimming the music track after the music start indicator to match a remaining portion of the video file after the video start indicator, and storing the trimmed music track in association with the video file;
displaying a native audio volume control item operative for controlling the volume of the native audio track while displaying the visual content;
receiving a first volume control profile for controlling the native audio track in association with playing of the video through user operation of the native audio volume control while playing the native audio track together with the visual content;
displaying a music track volume control item operative for controlling the volume of the music track while displaying the visual content;
receiving a second volume control profile, independent of the first volume control profile, for controlling the selected portion of the stored digital music track in association with playing of the video through user operation of the music track volume control while playing the music track together with the visual content;
creating an edited video file for simultaneously playing the visual content, the native audio track adjusted by the first volume control profile, and the music track adjusted by the second volume control profile;
receiving a selection of a stored publication list comprising one or more digital publication targets; and
publishing the edited video file to the publication list.

17. The computer storage medium of claim 16, further comprising:
receiving a voice-over track;
receiving a third volume control profile, independent of the first and second volume control profiles, for controlling the voice-over track in association with playing of the video;
storing the voice-over track adjusted by the third volume control profile as part of the edited video file.

18. The computer storage medium of claim 16, further comprising:
storing an additional section of the music track;
receiving a speed filter command and, in response to the reverse filter command, playing a portion of the visual content at an altered speed while playing the music track at an unadjusted speed;
storing the visual content adjusted by the speed filter while playing the music track at an unadjusted speed as part of the edited video file;
wherein, if the altered speed is slower than normal speed, playing a portion of the additional section of the music track in association with the visual content at the slower speed to accommodate the difference in speeds between the visual content and the music track.

19. The computer storage medium of claim 16, further comprising:
storing an additional section of the music track;
receiving a reverse filter command and, in response to the reverse filter command, playing a portion of the visual content in a reverse order while playing the music track in a forward order;
playing a portion of the additional section of the music track in association with the visual content to accommodate additional run time for the portion of the visual content played in the reverse order;
storing the visual content adjusted by the reverse filter while playing the music track in a forward order including the portion of the additional section of the music track to accommodate the additional run time for the portion of the visual content played in the reverse order as part of the edited video file.

20. The computer storage medium of claim 16, further comprising:
receiving a 3D filter command and, in response to the speed filter command, playing a portion of the visual content altered by the 3D filter; and
storing the visual content adjusted by the 3D filter as part of the edited video file.

21. The computer storage medium of claim 20, wherein the 3D filter comprises overlaying a 3D effect on the visual content configured to function with red/blue 3D glasses.

22. The computer storage medium of claim 16, further comprising automatically storing the edited video file to a network or cloud storage location in association with publication of the edited video file.

23. The computer storage medium of claim 22, further comprising automatically storing the edited video file to a second network or cloud storage location in association with publication of the edited video file.

24. The computer storage medium of claim 16, further comprising receiving one or more metadata tags and storing the metadata tags in association with the edited video file, wherein at least one of the metadata tags identifies a person appearing in the visual content, a source of the music track, or a source of a voice-over track associated with the edited video file.

25. The computer storage medium of claim 16, further comprising receiving a hashtag indicating social media trending information and storing the hashtag in association with the edited video file.

26. The computer storage medium of claim 16, further comprising receiving a geolocation tag indicating a geographic location associated with the edited video file and storing the geolocation tag in association with the edited video file.

27. The computer storage medium of claim 16, further comprising receiving a textual description of the content of the edited video file and storing the textual description in association with the edited video file.

28. The computer storage medium of claim 16, further comprising displaying the native audio volume control item comprising a slider control item.

29. The computer storage medium of claim 28, further comprising displaying the music audio volume control item comprising a slider control item.

30. The computer storage medium of claim 29, further comprising simultaneously displaying the native music and music audio control items together with displaying the visual content, and receiving the native audio volume profile and the music volume profile through user operation of the native music and music audio control items while displaying the visual content.

* * * * *